(12) United States Patent
Williams

(10) Patent No.: US 7,681,247 B2
(45) Date of Patent: Mar. 16, 2010

(54) ANTI-THEFT SYSTEM AND METHOD FOR SEMICONDUCTOR DEVICES AND OTHER ELECTRONIC COMPONENTS

(75) Inventor: Emrys J. Williams, Milton Keynes (GB)

(73) Assignee: Sun Microsystems, Inc., Santa Clara, CA (US)

( * ) Notice: Subject to any disclaimer, the term of this patent is extended or adjusted under 35 U.S.C. 154(b) by 2113 days.

(21) Appl. No.: 10/375,158

(22) Filed: Feb. 27, 2003

(65) Prior Publication Data

US 2004/0170068 A1 Sep. 2, 2004

(51) Int. Cl.
*G06F 1/26* (2006.01)
*G11C 29/00* (2006.01)

(52) U.S. Cl. ......................... 726/34; 365/200
(58) Field of Classification Search ............. 726/34, 726/35, 36; 713/168; 365/200
See application file for complete search history.

(56) References Cited

U.S. PATENT DOCUMENTS

| | | | | |
|---|---|---|---|---|
| 6,032,257 A * | 2/2000 | Olarig et al. | ............. | 726/35 |
| 6,067,076 A * | 5/2000 | Hocker et al. | ............. | 345/158 |
| 6,216,230 B1 * | 4/2001 | Rallis et al. | ............. | 713/185 |
| 6,606,707 B1 * | 8/2003 | Hirota et al. | ............. | 713/172 |
| 6,820,204 B1 * | 11/2004 | Desai et al. | ............. | 726/6 |
| 7,376,625 B2 * | 5/2008 | Koskela et al. | ............. | 705/57 |
| 2003/0110380 A1 * | 6/2003 | Carolsfeld et al. | ............. | 713/168 |

OTHER PUBLICATIONS

"Product Activation Overview," www.activatesoft.net/activation_overview, 2002, (1 page).
Matt Berger, "Poking holes in Microsoft's Copy Protection—Software Program spreading on the Internet allows users bypass controversial activation feature in Windows XP," www.pcworld.com/resource/printable/article/0.aid.69203.asp, Nov. 1, 2001 (2 pages).

* cited by examiner

*Primary Examiner*—Kambiz Zand
*Assistant Examiner*—Aubrey H Wyszynski
(74) *Attorney, Agent, or Firm*—Robert C Kowert; Meyertons, Hood, Kivlin, Kowert & Goetzel, P.C.

(57) ABSTRACT

A semiconductor device includes a stored device identifier that is accessible to external systems, and a stored secret key that is inaccessible to external systems. The device also includes an input, which in operation receives a system identifier, representing the system into which the device is to be incorporated, and an authorization key. An authorization unit within the device is then used for enabling or disabling the device in accordance with the values of the stored secret key, the received system identifier and the authorization key. The authorization key is typically supplied by a support center in response to being notified of the device identifier. In one embodiment, the authorization unit encrypts the system identifier using the stored secret key as the encryption key and then compares the result against the authorization key.

63 Claims, 4 Drawing Sheets

US 7,681,247 B2

ANTI-THEFT SYSTEM AND METHOD FOR SEMICONDUCTOR DEVICES AND OTHER ELECTRONIC COMPONENTS

FIELD OF THE INVENTION

The present invention relates to anti-theft technology for semiconductor devices and other components used in electronic systems.

BACKGROUND OF THE INVENTION

In computer technology, there is an inexorable trend towards miniaturisation, which is particularly apparent in the case of semiconductor devices (chips). Modern chips can contain millions of sub-micron transistors fabricated onto a single device. It will be appreciated that this leads to semiconductor devices that are highly compact, and also of considerable financial value.

It is also common for computer systems to be built around a modular structure, with a standard set of interfaces between different modules. This increases flexibility, in that a system of a particular power or capacity can be constructed by simply providing the requisite number of modules of the desired type. This applies not only to initial system design and construction, but also in terms of an upgrade path. For example if a customer needs more power then they can add additional modules, such as extra memory units, and/or replace an existing module by one that has a higher rating, for example because it includes a more powerful processor. The ability to use common modules across a range of systems also helps to reduce manufacturing and inventory costs, and makes overall management of the range simpler. Furthermore, where the modules can operate independently of one another, there may be the added benefit of redundancy, in that even if one unit fails, the system can continue operating on the remaining modules (albeit at reduced throughput).

Unfortunately, the modularity of computer system components, in conjunction with their high value and relatively small size, has made them highly attractive targets for theft. This can occur at a variety of levels. For example, a whole system may be stolen, either for sale on to an innocent third party, or for use by the criminals themselves. Another possibility is that a stolen system is broken down into its components, which can then be passed on to the open market for purchase. A further possibility is that rather than stealing complete systems, only particular modules are stolen, especially those that have high value and are easy to integrate into other systems. It will be appreciated that if computer parts appear on the second-hand market, it can be difficult to determine whether or not they have a legitimate history.

There are also various other forms of illicit activity associated with computer systems. For example, such systems, particularly at the high end, can be subject to export restrictions, especially to countries whose regimes are suspected of involvement with terrorist activities. Such states may then try to subvert these restrictions, either by buying whole systems on the open market (typically via some intermediary in a clandestine manner), or possibly by buying a range of modules, and then assembling them into a complete or workable system.

There is also the rather grey area of system or component reconfiguration. In this, legally acquired systems or components are broken down and/or assembled into different systems and components. For example, systems from a new range of computers may be nominally upgraded by adding network interface cards obtained at reduced cost from a downlevel range of computers from the same manufacturer. This sort of operation may or may not be legitimate, depending upon jurisdiction, and whether there is any misrepresentation to customers, breach of contract or warranty terms, and so on.

Another area of concern is the manufacture and supply of counterfeit components or systems. The counterfeits may be constructed from scratch by an illicit manufacturer, or they may be produced by modifying or augmenting one or more legitimate components. For example, a memory card may be formed by combining a genuine memory controller with counterfeit memory units, and then sold off as a completely bona fide article.

In addition to their general criminality, such activities can cause system vendors particular business problems. Thus they can lead to reduced sales and/or depressed prices for legitimate goods, as a result of competition from stolen or counterfeit goods. Furthermore, they can also damage a supplier's reputation and create support problems with legitimate customers who have inadvertently acquired and installed such illicit goods. This is because counterfeit components are frequently substandard in terms of quality, compatibility with other parts of the system, and so on. Moreover, stolen components, although constructed to the proper specifications, often suffer from degraded reliability. This can arise, for example, because they have been subjected to rough physical treatment or to inappropriate temperature and humidity as a result of their theft.

In addition, problems may also arise from third party reconfigurations (whether legal or otherwise). For example, if these involve components that were not originally designed or tested to interoperate with one another, then there may be an adverse interaction that affects overall system behaviour. There can also be problems if the reconfiguration is performed by personnel who do not have the relevant training and experience. (Moreover, such personnel may be reluctant, for various reasons, to exploit the official support channels).

Unfortunately, a customer may erroneously attribute operational difficulties arising from the above circumstances to the original manufacturer. This can clearly be detrimental to the general reputation of the manufacturer in the marketplace. Furthermore, the manufacturer may also be called upon to remedy any resultant fault(s), perhaps under a warranty or some other form of support contract. Of course, such contracts would not normally extend to cover stolen or counterfeit parts, but it is often very difficult to distinguish these in the field. Moreover, a faulty (illicit) part may lead to multiple problems elsewhere in the system. As a result, a manufacturer may be called in due to a general system problem, and it can be a very time-consuming process to trace this problem back to a fault in a particular (illicit) component. In addition, it can sometimes be difficult, from a commercial perspective, to refuse assistance to an important customer, even if their predicament is ultimately attributable to the (inadvertent) use of a stolen or counterfeit component.

It will be appreciated therefore that there is considerable interest in any technological measures that may be available to manufacturers to help protect against theft and other criminal activities involving computer systems.

SUMMARY OF THE INVENTION

Thus in accordance with one embodiment of the present invention, there is provided a semiconductor device that includes a stored device identifier and a stored secret key. The stored device identifier is accessible to external systems, whereas the stored secret key is inaccessible to external systems. The device further includes an input for receiving a system identifier and an authorisation key, and an authorisation unit. The authorisation unit is operable to enable or disable the device in accordance with the values of the stored secret key, the received system identifier, and the received authorisation key.

The authorisation key therefore enables a device having a particular device identifier to be used in a system having a particular system identifier. If the device is moved to a different system, then a different authorisation key will be required. The correct authorisation key for a given system can only be determined by someone who has knowledge of the secret key stored on the device, typically the manufacturer, or their authorised support organisation. It will be appreciated that this discourages theft, since the device cannot be usefully activated in another system without knowledge of the appropriate new authorisation key. Note that the secret key varies from one device to another. Consequently, even if the secret key for one device does become known, this does not help a criminal to access the secret key for any other device.

The length of the secret key is selected so that it is impractical for an adversary to guess the matching authorisation key on a given system using a brute force or trial and error attack. This can be assisted by ensuring there is a delay between the supply of successive authorisation keys. There are various ways in which this can be achieved, for example, by delaying any external indication of the success or failure of the authorisation key, and/or by requiring a power off/on cycle inbetween the supply of each new authorisation key.

In practice, the secret key is not normally completely inaccessible, since it will usually be discernible at some level of detailed testing. However, by making the secret key sufficiently inaccessible for such testing to be difficult and highly time-consuming, this then becomes an important economic deterrent to any illegal handling of the device.

A further consideration is that an adversary should not be able to subvert the protection scheme by over-writing or modification of the secret key (such as by setting it to a known value). Consequently, the secret key is typically stored in a one-time programmable memory, such as a blown fuse unit. This is set at manufacture, and cannot be subsequently modified. The secret key may be protected by an error correcting code (ECC), in order to help detect any corruption of the stored key that may have occurred (whether accidental or deliberate).

In one particular embodiment, the authorisation unit incorporates an encryption facility that encrypts the system identifier using the secret key as an encryption key. A comparator is then used for verifying the received authorisation key against the encrypted system identifier. The use of an encryption facility in this manner makes it very hard for third parties to deduce the secret key from any knowledge of previous valid system identifier/authorisation key pairs (for that device). Likewise, it is not possible to predict an authorisation key for a new system identifier simply on the basis of any previous valid system identifier/authorisation key pairs.

Note that the authorisation key may also be made dependent on the device identifier, as well as the secret key and system identifier. For example, the encryption unit could encrypt the system identifier and device identifier concatenated together in order to generate the authorisation key.

In one implementation, an initial timeout period is provided. During this period, the device is permitted to operate, irrespective of the supplied authorisation key and system identifier. It is only after the timeout period has expired that the authorisation disables the device if the correct authorisation key and system identifier have not been supplied. The provision of such a time-out period can be useful to allow the device to boot up properly, and also to allow preliminary testing and fault diagnosis.

In one embodiment, a pin is provided on the device to allow access to the secret key. This can be helpful for testing purposes, for example, to confirm that the secret key has been properly stored into the device. Such a pin may also be arranged to disable the authorisation unit, so that device operates irrespective of whether the correct (or any) authorisation key is provided. Again, this can be useful for testing the device, such as for laboratory debugging.

However, to avoid third parties using the pin to read the secret key or to otherwise subvert the authorisation process, the pin is generally located in a position that is inaccessible when the device is mounted for use on a printed circuit board (PCB). For example, the pin may be located underneath the semiconductor device (i.e. sandwiched between the PCB and the semiconductor device). Furthermore, the wiring on the PCB may be arranged so that the pin is disabled, for example, by hard wiring the pin to ground, where the pin is only operative for read-out if connected to a positive voltage source. Note that rather than having a single pin for both (i) accessing the secret key and also for (ii) disabling the authorisation unit, there may be separate pins for these two tasks (both secure). Alternatively, some devices may only support one of these two tasks, and so have only a single such pin.

A device along the lines described above can be incorporated into an electronic subsystem, such as a PCB. The subsystem itself is then usually intended for installation into a larger system (whether a computer, a car, telecommunications apparatus, and so on). The device can then act as an authorisation unit for the subsystem, by disabling the subsystem if the device is not supplied with the correct authorisation key.

In accordance with another embodiment of the invention, there is provided an electronic system comprising at least one component formed from a device or subsystem as just described. The system includes a system identifier, which is supplied together with an associated authorisation key to the component. Provided that the authorisation key is properly matched to the system identifier, this then allows the component to operate.

In one particular embodiment, the system stores a mapping of authorisation keys against device identifiers for the components included in the system. The system accesses the device identifiers stored in the components, and retrieves the corresponding authorisation keys. These keys can then be supplied to components, along with the system identifier. This process typically occurs at system start-up, and can be fully automated, based on the stored authorisation keys. Note that storing authorisation keys in this manner does not compromise security, because they are only useful for components installed into this particular system. (If a component were moved to another system, it would need a different authorisation key, in view of the changed system identifier).

If a new component is added into the system, then normally the authorisation key for this new component will not be known to the system. Accordingly, the system must acquire the relevant authorisation key from an appropriate source (such as a support centre provided by the manufacturer). This can be done by supplying the source with the device identifier for the new component, and the system identifier for the system. The interaction with the source may be performed automatically, such as by an on-line connection to the support centre, or may require human intervention. Note also that the authorisation key may potentially be obtained prior to actual installation of the component into the system, for example to allow the component to be kept as a spare part for immediate use with that system in the event of any sudden failure.

In one embodiment, a device or its associated subsystem is provided with a programmable read only memory (PROM), which is used to store an authorisation key for the device. This authorisation key is valid in conjunction with a particular corresponding system identifier, and can be used for example to preconfigure the device and its subsystem for installation in a system having the corresponding system identifier. If desired, the PROM can store a set of authorisation keys and matching system identifiers, in order to allow the device to be used in any system whose identifier and associated authorisation key are included in the PROM.

If the PROM is included within the device itself, the contents of the PROM (i.e. the stored authorisation key(s)) may be supplied automatically to the authorisation unit when the device is started up. Alternatively, the contents may be accessed by some external system control unit, which then extracts the relevant authorisation key for that system to pass back to the authorisation unit on the device.

One strategy to potentially circumvent the authorisation process just described is system spoofing. In this, a component is supplied with a fake system identifier, typically so that the component thinks it is still in a previous system (for which a valid authorisation key is already available). System spoofing can be countered by making some aspect of the system behaviour, such as a bus protocol, dependent on the system identifier (this is known as identity-colouring). Accordingly, unless all the components are using the same system identifier, they will not be able to interact with one another, and so the system will fail to operate properly.

As an additional precaution, the semiconductor device can be configured so that only a single system identifier can be supplied after power-on. Therefore, to supply a further system identifier requires a power off-on cycle. This then ensures that it is not possible to provide a first system identifier for authorisation purposes, followed by a second system identifier to overcome identity colouring (assuming that the authorisation process has to be repeated for each power off-on cycle).

In another embodiment of the present invention there is provided a method of manufacturing a semiconductor device. The method includes storing a device identifier and a secret key on the device. The device identifier is accessible to external systems and the secret key is inaccessible to external systems. The method further includes incorporating an authorisation unit into the device for enabling or disabling the device. The authorisation unit bases its action on the value of the stored secret key, and on the values of a system identifier and authorisation key that are supplied to it from an external source. Typically, this involves the authorisation unit determining the correct authorisation key based on the stored secret key and the provided system identifier, and then disabling or enabling the device following a comparison of the determined correct authorisation key with the supplied authorisation key.

It is expected that the manufacturer or other authorised party will maintain a record of the device identifier and secret key stored on each device. This information can then be used to generate an authorisation key corresponding to any supplied device identifier and system identifier. This then allows a specified device to be used in the desired system.

In one embodiment, where a device is installed at manufacture into a system, the system is provided with the authorisation key for this device. Thus a listing is created and stored in the system that maps the authorisation key to the corresponding device identifier for each device included in the system. This then allows the system to be activated by a customer, without the need to input any further authorisation keys.

In accordance with another embodiment of the invention, there is provided a method of operating an electronic system which includes the steps of maintaining a system identifier for the electronic system, and ascertaining a device identifier associated with each device included in the electronic system. The system then provides an appropriate authorisation key and a system identifier to each device, which is then used for determining whether or not to enable the operation of that particular device.

Typically the management and supply of the authorisation keys is performed by some system controller or other system management facility, which is responsible for handling the power-up of the system. In doing so, the controller sends a request to each device installed in the system (that supports this authorisation procedure), and receives a response back including the device identifier for that component. The controller further maintains a listing of known device identifiers and associated authorisation keys. The received device identifiers can therefore be used to retrieve the corresponding authorisation keys for supply to the relevant devices.

If an authorisation key is not available for a device having a particular device identifier (for example, because the device is newly installed), a request can be made for the authorisation key for the device. The request includes the system identifier and the device identifier for which an authorisation key is needed. The request for the authorisation key is typically directed to some appropriate support organisation, and may be made automatically via an on-line connection, or potentially manually (for example by telephone or using a web site). In response to the request, an authorisation key is received, which can then be supplied to the relevant device (along with the system identifier). Note that the received authorisation key is also stored within the system, along with the other device identifier/authorisation key pairings, so that it will be available on future occasions when the system is powered up.

In accordance with another embodiment of the invention, there is provided a method of operating a support centre. The method includes maintaining a database of components, in which for each component there is a stored device identifier and a stored secret key. Then, when the support centre receives an authorisation request to allow a component having a particular device identifier to be used in a system having a particular system identifier, the secret key for this component is retrieved, based on the received device identifier. An authorisation key is now determined for the component, using the received system identifier and retrieved secret key, and this authorisation key is then provided in a response back to the original request.

In processing requests for authorisation keys, a check can also be made that the device and system identifiers in the request are legitimate. For example, it can be confirmed that the identifiers do not correspond to a system or device that has been reported stolen. If it turns out that there is in fact some uncertainty about the status of the system or device, then further checks may be performed, and the authorisation key may be withheld, at least temporarily.

Note that the request to the service centre can also be analysed in other ways to support the business, beyond the detection of criminality. For example, the support centre may have access to compatibility data, and so be able to warn the customer if the specified device (as per the device identifier) is not generally suitable for installation into the specified system (as per the system identifier).

In accordance with another embodiment of the invention, there is provided a program product comprising machine instructions on a medium for loading into an electronic system. The instructions when loaded cause the system to perform the steps of: accessing a system identifier for the electronic system; ascertaining a device identifier associated with a component of the electronic system, the component including a secret key; and providing an authorisation key and the system identifier to the component, wherein the authorisation key is dependent upon the system identifier and the secret key. The component can then be disabled or enabled according to whether or not the correct authorisation key is provided.

There is also provided in accordance with one embodiment of the invention a program product comprising machine instructions on a medium for loading into a computer. The instructions cause the computer to perform the steps of: receiving a request to allow a component having a particular device identifier to be used in a system having a particular system identifier; accessing a database of components, wherein for each component the database includes a stored device identifier and secret key; retrieving from the database the secret key for the component based on the received device identifier; determining an authorisation key for the component, based on the received system identifier and retrieved secret key; and providing a response to said request, wherein the response includes the determined authorisation key.

Such machine instructions can be provided on a physical storage medium, whether a magnetic device (disks/tapes) or an optical device (CD/DVD), and so on. Alternatively, the machine instructions may be made available from a server or other system for download over a transmission medium. The transmission medium is typically a wired or wireless connection, such as the Internet, a LAN, or any other suitable communications path.

It will be appreciated that the method and program product embodiments of the invention will generally benefit from the same particular features as the system embodiments set forth above.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1:
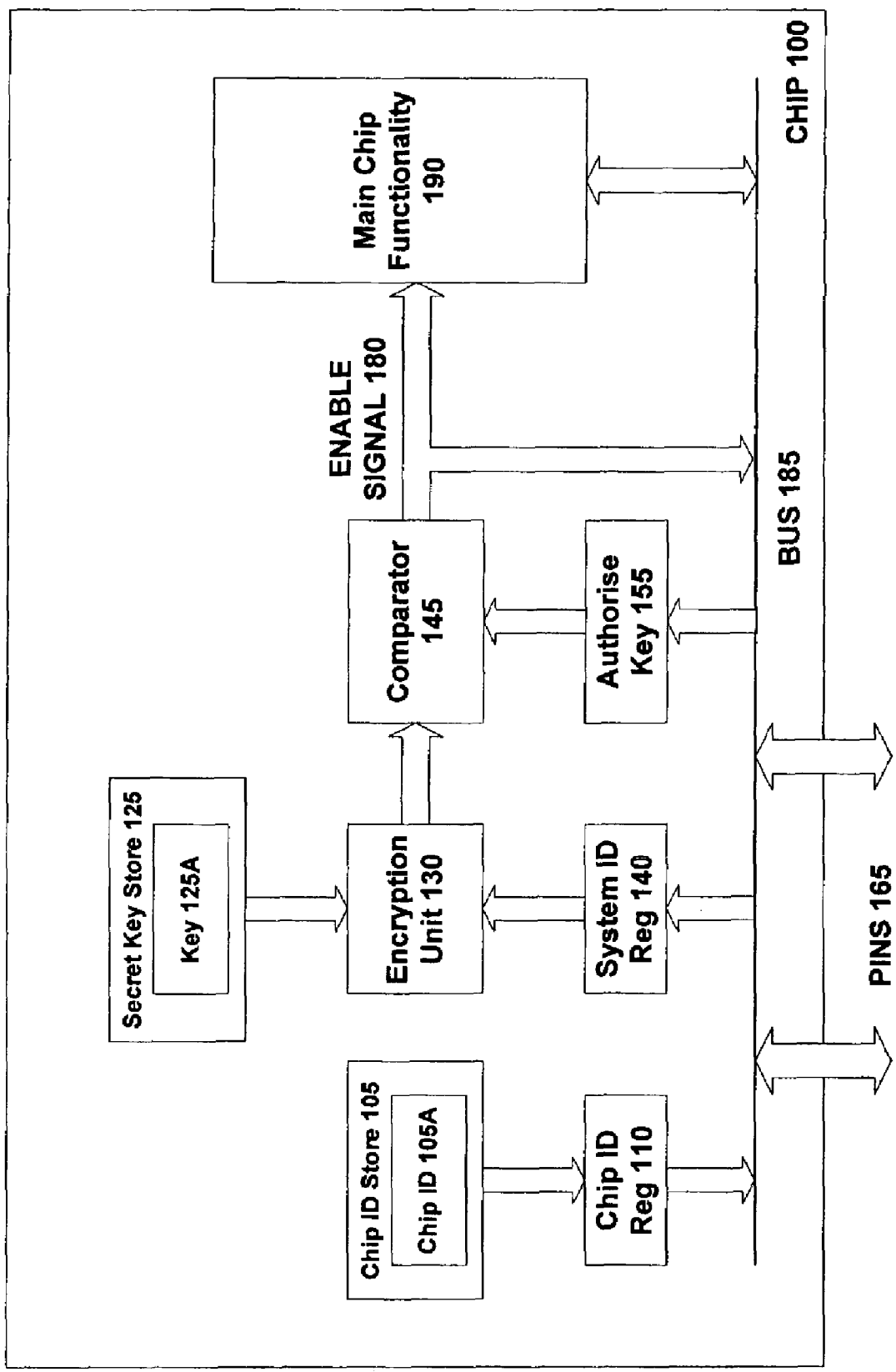
FIG. 1 is a schematic diagram of certain components within a semiconductor device constructed in accordance with one embodiment of the present invention.

FIG. 1 is a block diagram of a semiconductor device 100 constructed in accordance with one embodiment of the invention. Note that only those components relating to the anti-theft technology described herein are individually shown in FIG. 1. The remaining components, which support the primary function of the device (processing, communications or whatever), are shown schematically by block 190. Note that in practice block 190 will generally occupy most of the space on chip 100.

In terms of the anti-theft technology, the chip 100 includes a store 105 containing a chip identifier (CI) 105A. In one embodiment, this identifier 105A is just the die ID. The chip identifier 105A is programmed separately into every die by a laser blown fuse or other suitable one-time programming means at manufacturing time. The die ID (or other form of chip identifier) is therefore unique to a given chip. (Note that this means that each individual physical chip has its own identifier, rather than there being a common identifier across all chips of the same design, or across all chips that were fabricated using the same mask).

The skilled person will be aware that die IDs are already routinely provided in the manufacture of complex chips. This is primarily for quality control purposes, so that if a chip later fails in the field or in a subsequent manufacturing stage, then the chip can be traced back to its particular time and place of construction, to help analysis of the fault cause.

Associated with the chip ID store 105 is a chip ID register 110. When the chip is powered up, this register is loaded with the chip ID 105A from the chip ID store 105. The chip ID register 110 is connected via chip bus 185 to input/output pins 165. Accordingly, the value of chip ID register 110 can be read by external devices using these input/output pins. (It will be appreciated that chip ID register 110 allows other components ready access to the chip identifier; however, in other embodiments, it may be omitted, with this information being obtained directly from chip ID store 105 itself).

Chip 100 also includes a secret key store 125. This is programmed in the factory to store a secret key 125A, analogous to the way that the chip ID 105A is programmed into chip ID store 105. Each chip 100 has a different secret key 125A assigned to it. Note that there is no path on the chip 100 that allows an external device to access the secret key store 125. Rather, the value 125A contained in this store 125 is only available to selected internal hardware components within chip 100. Furthermore, it is important that the secret key 125A is not dependent at all on the chip ID 105A, given that the latter is externally accessible from the device.

Chip 100 also includes two registers, system ID register 140 and an authorisation key register 155, both of which are attached to bus 185. In operation, these two registers each have a value written into them by an external source. The value written into the system ID register represents an identifier for the system into which the chip 100 has been incorporated. This value is then processed by an encryption unit 130 in conjunction with the secret key 125A from store 125. The output from encryption unit 130 is checked by comparator 145 against the authorisation key that has been stored into register 155. If comparator 145 finds a match, it sends an enable signal 180 to allow the rest of the chip 190 to perform its intended task. On the other hand, if no match is found, then enable signal 180 is not sent, and thus the chip 100 is in effect prevented from operating.

Of course, enable signal 180 may also be implemented as a disable signal that is produced on a negative output from comparator 145. Thus absent this disable signal (i.e. in the event of a positive match), the chip is allowed to function as normal. It will be appreciated that in any given embodiment, the skilled person can select whether to use an enable signal or a disable signal, depending on the details of the particular implementation in question. It will further be appreciated that there are a variety of known mechanisms whereby enable signal 180 can be used to enable or disable chip 100 as appropriate. For example, enable signal 180 could be used to isolate components 190 from the voltage power rails, or it may lock certain input/output pins to a particular value, thereby preventing useful operation of the chip.

As shown in FIG. 1, the value of enable signal 180 is supplied to bus 185, and so is accessible to external devices via pins 165. This therefore allows such external devices to see whether or not the correct authorisation key has been supplied, and hence whether or not the chip 100 has been put into its proper operational state.

Note that although bus 185 in FIG. 1 has been shown as a single bus, connected to various pins 165, it will be appreciated that this is just a simplified schematic representation of the internal communications within chip 100. Thus in a practical implementation, there may not be any general bus at all, or there may be multiple such buses. Furthermore, the various components may be connected directly to any relevant input/output pins by a suitable communications path, rather than via a single shared bus. For example, chip ID register 110, system ID register 140, and authorisation key 155 may all be directly connected to their own input/output pins, without any intermediate bus.

Figure 2:
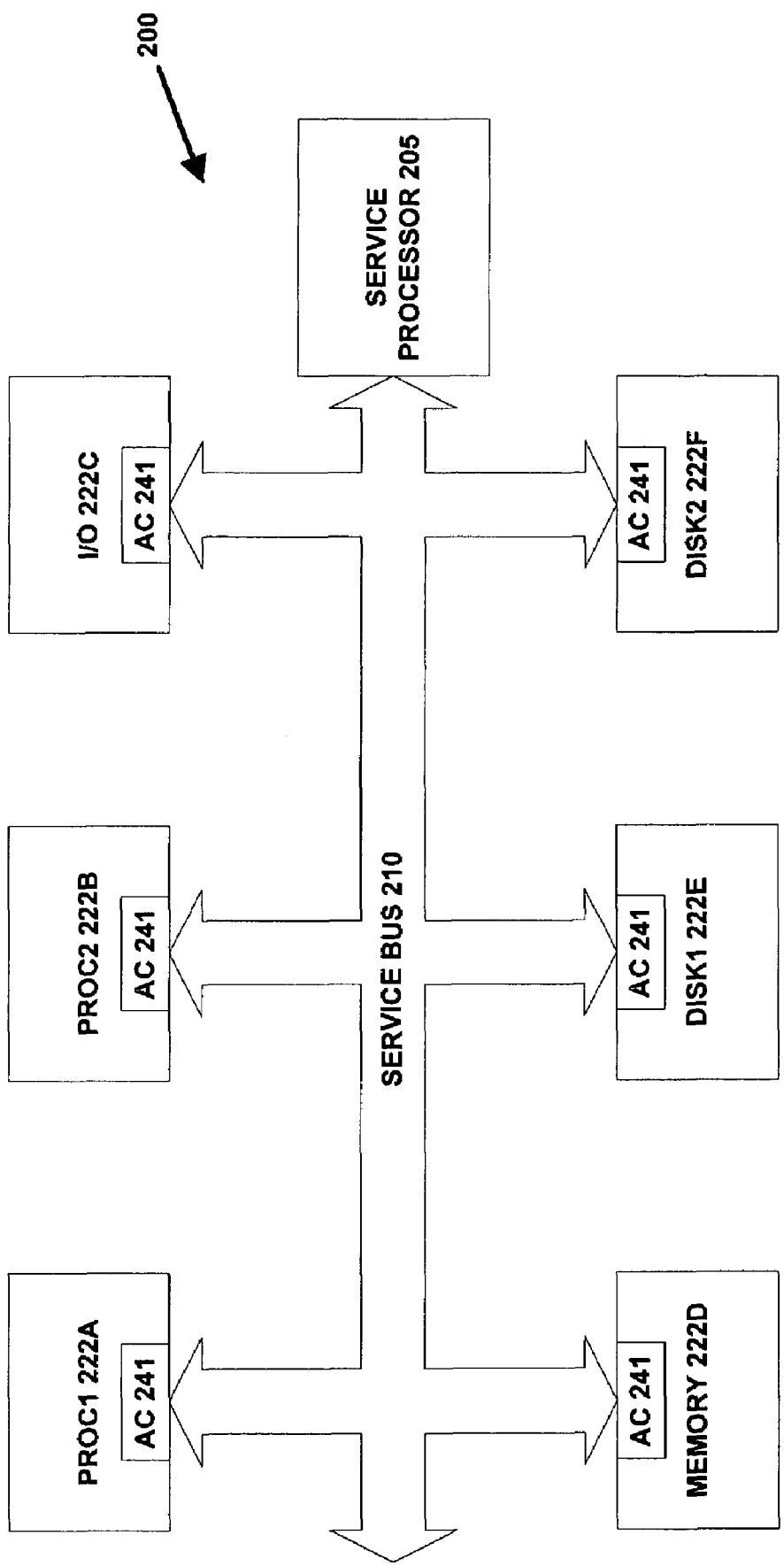
FIG. 2 is a schematic diagram of one example of a computer system incorporating multiple semiconductor devices such as shown in FIG. 1.

FIG. 2 is a schematic diagram of a computer system 200 that incorporates various cards or modules 222. In the particular system shown in FIG. 2, there are two processor cards 222A and 222B, an input/output interface unit 222C, a memory unit 222D, and two disk units 222E and 222F. These components are interlinked by a service bus 210, which in turn is controlled by a service processor 205. The service processor 205 has overall responsibility for the management and control of computer system 200, and may be implemented as a separate computing subsystem. The service processor 205 receives various diagnostic information over the service bus 210 in order to monitor the state and operations of the various modules 222, and can likewise send control commands over the service bus to the modules. Note that a separate bus or other communications link (not shown in FIG. 2) is provided to handle standard operational data transfers between the modules 222, for example when processor card 222A reads data from memory unit 222D or from disk unit 222E.

One possibility is to incorporate an authorisation facility such as described in FIG. 1 into every single semiconductor device in system 200. However, this would typically require a rather long and complex the authorisation procedure. Accordingly, each module 222 in the system of FIG. 2 has only one device having the general structure of chip 100 (as shown in FIG. 1). This device is authorisation chip 241, which serves as the interface between the service bus and its host module (i.e. the one in which the authorisation chip is located). The main function of the authorisation chip 241 (corresponding to block 190 in FIG. 1) is to assist the service processor 205 with the control of the host module. For example, any interrupts raised within a module 222 are reported back to the service processor 205 via the authorisation chip 241. In addition, any commands sent by the service processor 205 to alter settings on a particular module 222 are received by the authorisation chip 241 over the service bus 210, and then passed on to the relevant component within the module. (Further description of the main functioning of the authorisation chips is omitted, since it is not directly relevant to an understanding of the present invention).

Because the main functionality 190 of authorisation chip 241 plays a central role in the operation of a module 222, the authorisation chip 241 represents a highly suitable location for the authorisation facility described with reference to FIG. 1. In other words, if authorisation chip 241 is disabled (i.e. not authorised), then in effect this prevents the relevant module 222 from functioning within system 200, since it can no longer interoperate properly with the other components in the system.

Figure 3:
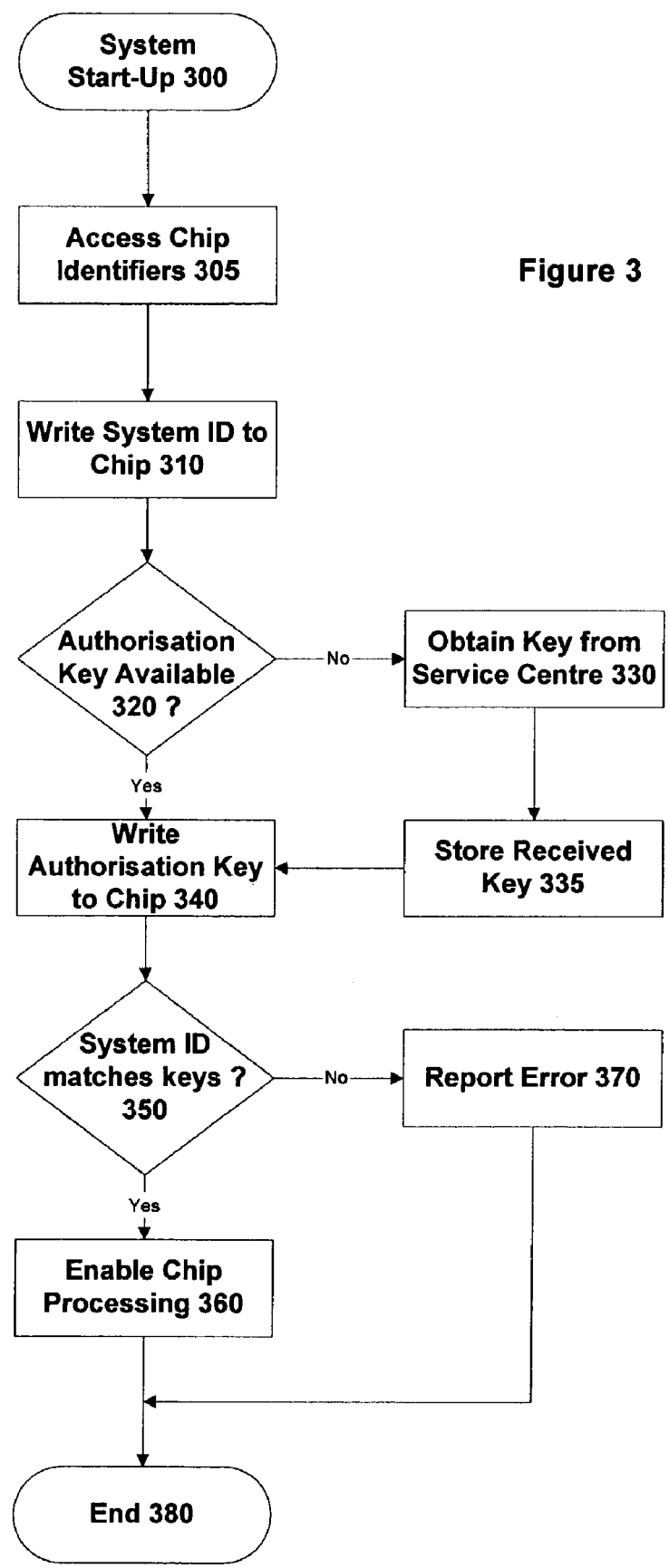
FIG. 3 is a flowchart illustrating a start-up procedure for the system of FIG. 2.

FIG. 3 is a flowchart depicting the operation of the anti-theft technology illustrated in the chip 100 of FIG. 1 incorporated into the computer system of FIG. 2. The method commences when the system is powered up (step 300). As part of this start-up, each chip writes its stored chip ID 105A into the chip ID register 110. Next, the service processor determines which modules are present in system 200, by reading the chip IDs from the chip ID registers 110 in their respective authorisation chips 241 over the service bus 210 (step 305).

The service processor now proceeds to write the system ID for system 200 into the system ID register 140 of each authorisation chip 241 (step 310). It will be appreciated that the system ID for system 200 is typically stored in some programmable ROM accessible to (and potentially incorporated into) the service processor 205. This system ID is also used for a variety of other (known) purposes, including providing domain host IDs and network MAC addresses. Typically therefore, the system 200 cannot successfully boot up if the system ID is unavailable.

The service processor then determines whether an authorisation key is stored for each of the modules 222 (step 320). Thus for each chip ID 105A retrieved at step 305, it is ascertained whether a corresponding authorisation key is available. If not, it is necessary to obtain the correct authorisation key from a service or support centre (step 330), as described in more detail below. This then allows the authorisation key for each module 222 to be written into the appropriate register 155 for that module (step 340). In addition, any newly received key (in conjunction with its associated device identifier) is stored (step 335) with the other authorisation keys. Consequently, on subsequent occasions this authorisation key can be retrieved directly, without having to contact the support centre. In other words, for future system start-ups, the test of step 320 will be positive for this particular device.

The modules now perform an internal validation procedure (step 350), again as described in more detail below, in order to compare stored secret key 125A against the supplied system identifier and authorisation key. If a match is obtained, the chip generates an enable signal 180 (step 360), which allows the chip to start its normal processing. On the other hand, if a proper match is not obtained, implying that the wrong authorisation key was provided, an error is reported back to the service processor (step 370), and the authorisation chip 241 concerned is not enabled. This has the effect of disabling the module 222 that contains this authorisation chip, since the module is now prevented from communicating properly over the service bus 210 with the service processor 205, and so is prevented from being operationally incorporated into system 200.

It will be appreciated that there is some flexibility in the ordering of steps within the flowchart of FIG. 3. For example, steps 305 and 310 could be interchanged, with the service processor initially broadcasting the system ID, and this then triggering the authorisation chips to send their chips IDs back to the service processor. Alternatively, writing the system ID to the chips at step 310 might be delayed until the full set of authorisation keys is available (i.e. this could then be performed in parallel with the distribution of authorisation keys at step 340). It will be appreciated that the skilled person will be aware of still further possible variations.

Returning now to the operation of the encryption unit at step 350, this generates a particular combination of the supplied system ID and the stored secret key 125A that can be compared against the supplied authorisation key. For a given chip 100 having a particular secret key 125A, the system ID and the authorisation key can therefore be regarded as a matched pair, in that the authorisation key allows that chip 100 to be used in a system having the matched system ID. However, this same pair of system ID and authorisation key cannot be used in conjunction with another chip 100, because they are dependent on the value of the secret key 125A.

The function used for the combination of the secret key and system ID is selected so that it is not possible to deduce the secret key from knowledge of the authorisation key and the system ID. Furthermore, if the authorisation key needed to operate the chip 100 in a first system ID is known, it must not be possible to deduce the authorisation key to work with a second system ID, even if there is only a small difference between the first and second system IDs.

Various mathematical functions that are suitable for this task are already known, particularly from the field of encryption. Thus if denoting the secret key by SK, the system ID by SI, and the authorisation key by AK, in one embodiment encryption unit 130 generates AK by encrypting SI as plain text, and using SK as the encryption key. Any suitably secure encryption algorithm can be used for this purpose, whether symmetric, such as the Data Encryption Standard (DES), or asymmetric, such as one based on the Rivest, Shamir and Adelman (RSA) algorithm. It will be appreciated that with the use of such algorithms, it is (believed to be) impossible to determine the value of the private key based on knowledge of the matched system ID and authorisation key pair. (It is a standard property of advanced encryption algorithms that a comparison of the clear and encrypted texts does not compromise the key that was used in the coding process).

Note that encryption unit 130 does not necessarily have to employ an algorithm from conventional cryptography. For example, encryption unit 130 may instead comprise a pseudo-random number generator, such as a linear feedback shift register (LSFR). In this case, the authorisation key can be determined by (i) using the secret key to seed the LFSR; and (ii) then advancing the random number generator by a number of cycles determined by the system ID. Of course, the support centre must know and be able to mimic the behaviour of the pseudo-random number generator, in order to be able to predict and supply the appropriate authorisation key for a changed system ID.

One potential drawback with this approach is that if the structure of the LFSR is known, then it becomes possible in principle to go in the reverse direction, in other words, from the authorisation key back to the secret key. This is a particular vulnerability if the same pseudo-random number generator is used for all versions of the chip. (It will be appreciated that encryption algorithms such as DES, RSA and the like, are superior in this respect, in that even if the algorithm implemented by encryption unit 130 is known to an adversary, this still does not, of itself, compromise the security of the secret key).

The pseudo-random number generator approach can be enhanced by customising the generator for each individual chip (such as by varying the feedback configurations of the LFSR). A record of this configuration would then also have to be maintained by the service centre along with the secret key, in order to generate authorisation keys for that chip. Of course, the feedback configuration used for any particular chip may be accessible through detailed inspection of that chip, but the same also applies to the secret key store 125 itself. Various measures can be taken to guard against this (see below).

A further consideration in the selection of the algorithm to employ in the encryption unit 130 is ease of hardware implementation. For example, a LFSR can be formed very readily and compactly within chip 100. In contrast, encryption techniques such as DES or RSA are more complex, but nevertheless standard hardware implementations are readily available (although they may be subject to some export restrictions). Overall, it will be appreciated that the particular algorithm adopted for any given device will depend upon details of the device involved, for example, the other components present in the device, cost, vulnerability to theft, and so on.

In some embodiments, the chip ID is also incorporated into the encryption algorithm (this then implies a link between the chip ID store 105 or the chip ID register 110 and the encryption unit 130 of FIG. 1). For example, the chip ID 105A and system ID could be concatenated together and then encrypted using the secret key 125A as the encryption key in order to generate the authorisation key. Since the chip ID is already passed to the support centre during the authorisation process (step 330 of FIG. 3), this does not cause any additional overhead for the support operation.

As previously indicated, the value of the secret key (SK) is programmed into chip 100 at manufacture. The key for each chip should be generated on a random basis, so that even if the secret key for one chip were compromised, this does not undermine the security of the secret keys in other chips. In this respect, it is better to use a true random number generator, based on an inherently unpredictable physical phenomenon (such as thermal noise), rather than a pseudo-random number generator, whose sequence could possibly be determined. It may be convenient to ensure that duplicate keys are not used for different chips, although strictly speaking this does not matter provided that the keys are properly random (each pair of chip ID and secret key would still be unique).

Following manufacture, it is important to retain knowledge of this value of SK in conjunction with the chip identifier (CI), so as to be able to generate future authorisation keys. The chip manufacturer (or other authorised party) therefore maintains a database of CI to SK mappings. When a system 200 such as shown in FIG. 2 is then assembled by a manufacturer, the service processor 205 is loaded with the proper authorisation keys (AK) for the components (chips 100) included in the system. The authorisation keys are generated from the system IDs to be assigned to the new system and the stored secret keys using the same encryption function as implemented in encryption unit 130. Consequently, when system 200 is installed by a customer, the test of step 320 will be positive, and the system can power up properly.

Consider now the situation where the system is reconfigured by adding a new part or module. If this part is taken from another machine, then the old authorisation key may be available. However, this old authorisation key will no longer work in the new system, given the change in system ID. Alternatively, the part may be supplied (brand) new from a warehouse. However, again there is unlikely to be a valid authorisation key already available for that part (unless the system ID where it is to be installed is known in advance).

As a result, once the new part is installed into the system 200, the service processor will read its chip identifier (at step 305 of FIG. 3), and recognise that it does not possess an authorisation key for this component. The test of step 320 will therefore prove negative, and so it is necessary to obtain a valid authorisation key for the new part. This can be done by contacting the service centre for the manufacturer (as at step 330), and informing them of the chip ID for the new component, and the system ID for the system into which it has been installed.

Using the database of CI→SK mappings, the service centre determines the secret key for this component, and then calculates the authorisation key to allow it to operate in this particular system. For example, in the embodiment described above using the DES or RSA encryption algorithms, the authorisation key is generated by encrypting the system ID, using SK as the key. This value is then passed back for supply to the service processor 205, so that the newly installed component can be enabled.

The request for the authorisation key and the input of the received value can be done manually, for example by a technician (whether belonging to the customer, the manufacturer, or some third party service organisation). For example, the technician can telephone the service centre, and inform them of the system ID and chip ID concerned. The technician is then told the correct authorisation key, which he or she enters by hand into the service processor in order to enable the system.

Alternatively, the process may be done automatically by the service processor in response to finding that it does not have the authorisation key for a particular installed component. In this arrangement, the service processor responds to the absence of an authorisation key by forming an on-line connection to the service centre, and then requesting and receiving the required authorisation key on-line. It is also possible to use various hybrids of the manual and automatic approaches. For example, a technician may telephone to request the authorisation key, with this then being provided on-line. Conversely, the service processor may automatically request the authorisation key, but this is then only provided on the telephone to a human being. A further possibility is to provide a web site that allows authorisation keys to be requested and/or received.

It will be appreciated that the selection of which particular technique to use will be dependent on the particular security controls that are in place. For example, a particular protocol may be enforced for any on-line contact between the service processor and the service centre regarding the provision of an authorisation key, in order for the latter to ensure the authenticity of the former. In addition, any web site used may be subject to a password or other form of restricted access.

Prior to providing the authorisation key (whether via the telephone, web-site, or other form of link), the support centre confirms that the chip ID is legitimate, in other words, is not listed as having been reported stolen. Typically this status information is stored in the CI→SK database itself, or in some other readily accessible on-line source. The support centre may further determine whether the chip is currently in the possession of the expected customer.

The retrieved information is then used to determine whether or not to the supply the authorisation key, and can also be used to trigger appropriate further action. This may include investigative action if there are any suspicious circumstances involved. The information may also be used for other business purposes, such as updating customer records, tracking the use and operation of various parts through their operational lifetime, and so on. It will be appreciated that such data is potentially valuable for a variety of business purposes. For example, if many customers are found to perform the same upgrade for a given system, this may indicate a gap in the product range for that system. A further possibility is that the information is used to detect potential incompatibility, such as where a device is not supported by the system into which it is about to be installed.

The length of the key used to protect a chip determines how easy it would be to guess the authorisation key based on a brute force attack. Thus for a key of length n bits, the number of possible keys, and hence the time expected to be required for such a brute force attack to succeed, increases as $2^n$. The secret key 125A is typically 32, 64, or 128 bits in length, but shorter or longer keys could be used, dependent on the particular circumstances, such as the value and complexity of the device in question.

In addition, various measures can be implemented to provide further defence against a brute force attack. For example, the provision of the Enable signal 180 to bus 185 may be delayed, or the device may allow the authorisation code to be programmed only once after power-on, so that the device must be power cycled between each trial. It will be appreciated that such measures prevent an adversary from rapidly attempting a succession of possible keys, and so ensure that any brute force attack would be prohibitively slow.

In one embodiment, the secret key store 125 is formed such that its contents are readable by a chip test fixture immediately after manufacture. Such a mechanism can be used to confirm that the secret key has been stored properly, and also to create an entry from the chip in the CI→SK mapping database (this entry could alternatively be derived from the random number generator used in the fabrication process itself).

In order to prevent this from providing a mechanism for third parties to subsequently read out the secret key for installed devices, the wiring of the chip in the test fixture is made deliberately different from that used in an installed configuration. For example, in a field printed circuit board (PCB), a particular pin may be soldered to ground, which then inhibits read-out of the secret key. However, in a test fixture this pin can routed to the positive voltage rail instead, which then allows access to the secret key. As a further precaution, the read-out pin should have a highly inaccessible location on the chip (after installation), for example, in the middle of a ball grid array (BGA) on the underside of the chip (i.e. on the side adjacent to the PCB). In this situation, the pin could only be accessed by unsoldering the chip from the PCB, or drilling a hole through the PCB itself (avoiding any components or lines on the reverse side of the PCB). Both of these are relatively complex and skilled operations, and are likely to make such a form of attack economically unattractive.

It will be appreciated that in other embodiments, the chip is not provided with such a read-out mechanism. In this case, testing of the secret key store can be performed by utilising matched pairs of system ID and authorisation key, and confirming that the chip is suitably enabled (and conversely that it is disabled if the pairs are not properly matched). This approach can be regarded as strengthening the overall security of the secret key, albeit at the potential cost of a slightly more cumbersome testing procedure.

In some embodiments, the device is provided with a pin to allow the authorisation unit to be bypassed. This is typically useful when testing or debugging the device in the laboratory. The pin involved may be the same one as used to allow access to the secret key as described above (if such access is provided), or it may be a separate pin. In the latter case, it will be appreciated that the pin should again be made secure against use by third parties, such as by being located underneath the device (when bonded to a PCB), and hard-wired to an inoperative setting (i.e. where the authorisation process is not disabled).

Note that the secret key store may not necessarily be programmed with the secret key until after assembly of the chip onto a PCB or other appropriate component. In order to ensure that the chip is not subsequently re-programmed, the store should be implemented using electrical fuses, or any other appropriate one-time mechanism. One advantage of this approach occurs when the chip manufacturer is different from the system manufacturer, where it is assumed that the latter will be responsible for the authorisation process. In this arrangement, the chip manufacturer does not install the secret keys, rather this is done by the system manufacturer. Since the chip manufacturer then has no knowledge of the secret keys, this avoids one possible route for compromising them. (Of course, if the chip manufacturer does install the keys, it would normally be contracted to keep them confidential; nevertheless, this cannot be regarded as quite as secure as the chip manufacturer not knowing the keys in the first place).

It will be appreciated that the use of secret keys above to implement an authorisation mechanism offers good protection against theft and other forms of illicit activity. For example, if a part is stolen, then it will not be possible to integrate this into another system for a (potentially innocent) customer without having to request from the support centre an authorisation key for the relevant chip ID. Assuming that the manufacturer receives reports of stolen items, this request can then be used to recover the stolen property, and also possibly to apprehend the criminals involved.

In terms of counterfeit goods, the support centre will have no knowledge of the relevant chip ID and secret key, and so will not be able to properly authorise them. Of course, the counterfeiter may copy a chip ID and secret key from a genuine component. However, it is very difficult for the counterfeiter to obtain multiple valid pairings in this way. On the other hand, if the same set of identifiers is given to a large number of counterfeit components, then this will rapidly become discernible, as authorisation is repeatedly sought for the same device identifier. Likewise if the counterfeit manufacturer does not implement the anti-theft technology at all, this then becomes a ready means of distinguishing bona fide components from fake ones.

Furthermore, in terms of illicit component purchases by foreign states as a mechanism for subverting export restrictions, when these components are assembled into a complete system, this will not be operable unless the relevant secret keys for each of the components has been obtained.

Figure 4:
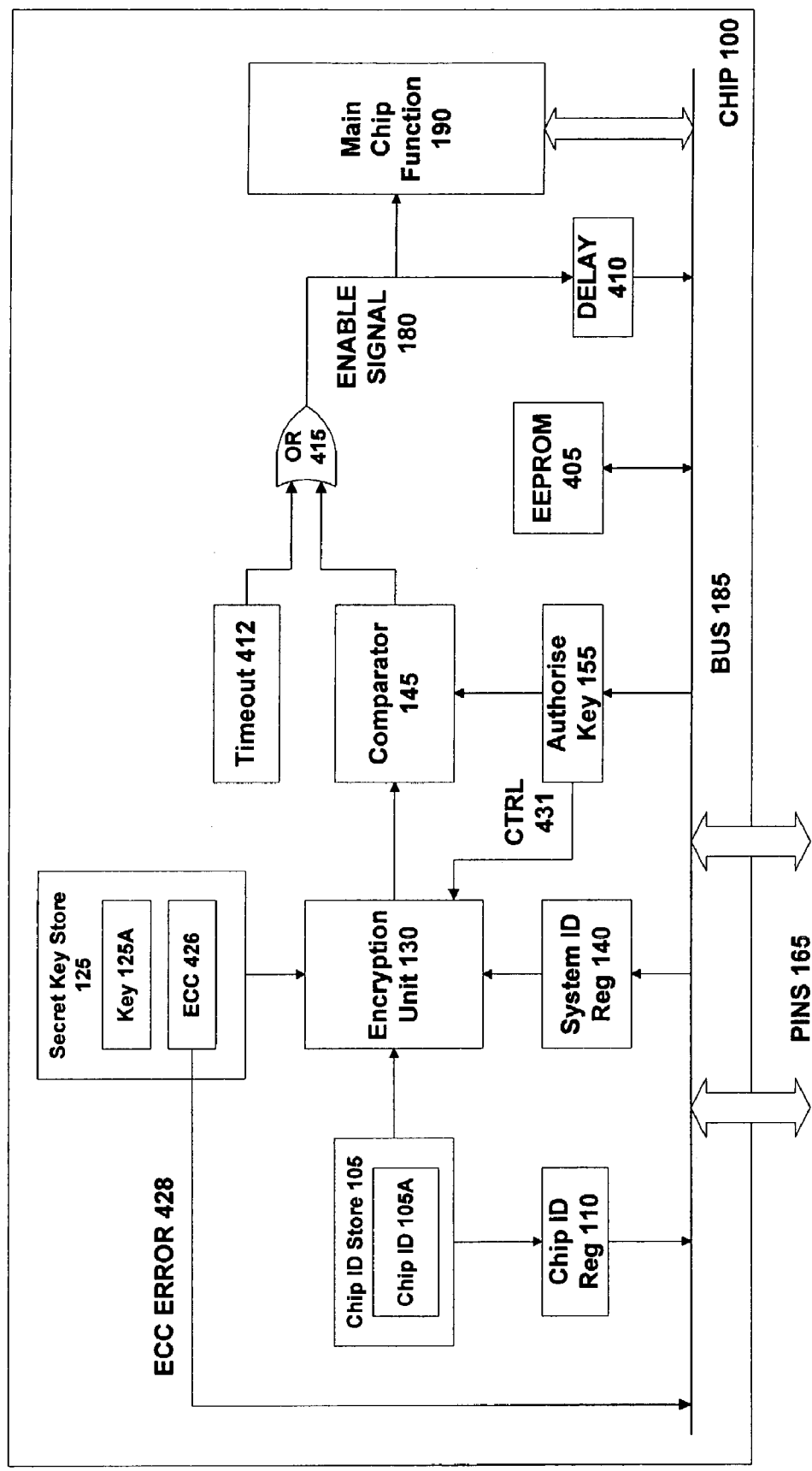
FIG. 4 is a schematic diagram of certain components within a semiconductor device constructed in accordance with another embodiment of the present invention.

FIG. 4 shows a semiconductor device in accordance with an alternative embodiment of the invention. In particular, this embodiment is similar to that shown in FIG. 1, but with the addition of various extra features. (Since the features that are in common with the embodiment of FIG. 1 have already been described, they will not be discussed now). Note also that although the extra features of FIG. 4 are shown all together in a single embodiment, they are largely independent of one another in terms of function. Hence, other embodiments may be intermediate the embodiments of FIG. 1 and FIG. 4, with only one or a limited set of the extra features being present.

One additional feature in FIG. 4 is the provision of EEPROM 405. This can be used to store an authorisation key that allows chip 100 to be used in a particular system. In this case, the processing in the flowchart of FIG. 3 is modified such that if a device authorisation key is not available to the service processor 205 at step 320, the service processor 205 initially attempts to read the missing authorisation key from EEPROM 405. If this attempt is successful, then the service processor 205 can write this key into authorisation key register 155 without having to contact the service centre. At the same time, the service processor can store the value read from EEPROM 405 into its own database of devices and corresponding authorisation keys, so that it is readily available next time the system is started up. (Alternatively, the service processor may dispense altogether with its own database of authorisation keys, and simply read them as required at every start-up from the EEPROM 405 in each respective chip 100).

The provision of a valid authorisation key in EEPROM 405 is useful when the chip is being used in a module intended for a known system. This may occur at initial system manufacture, or subsequently if the module is a field replacement unit (FRU) to be incorporated into an existing system. In this latter case, the FRU can be delivered already pre-programmed or configured for a particular system, without the need for any further (external) authorisation process. Note that although EEPROM 405 is shown in FIG. 4 as being incorporated into chip 100, it could be provided separately from chip 100, but on the same module or device (i.e. the same FRU).

In some embodiments, EEPROM 405 may be provided with a set of one or more pairs of system ID and corresponding authorisation key. This can be helpful if a customer has multiple systems, and wishes to order a FRU that is ready to install into any of these systems. In this case, when the service processor reads the contents of EEPROM 405, it scans through to find the system identifier that matches the current system (in which the chip is located), and then uses the authorisation key corresponding to this system identifier in order to authorise the newly installed device.

In the embodiment of FIG. 4, the authorisation key stored in EEPROM 405 is read out by the service processor and then stored back into authorisation key register 155. In an alternative embodiment, comparator 145 directly accesses EEPROM 405 in order to see if it contains a valid authorisation key (instead of, or potentially as well as, looking in authorisation key register 155). As a security precaution, EEPROM 405 can be made writable but unreadable by the external system. This then avoids third parties having access to any authorisation key/system ID pairings, which can help to protect the encryption algorithm. As in the embodiment of FIG. 4, EEPROM 405 may contain just a single authorisation key, appropriate to one particular system identifier, or a set of multiple system ID/authorisation key pairs. In the latter case, the system identifier stored in register 140 can be used to determine the particular authorisation key that is supplied from EEPROM 405 to comparator 145.

A further feature shown in FIG. 4 is the use of an error correcting code (ECC) to protect the secret key 125A stored in secret key store 125. As is well-known, the simplest ECC schemes (such as a single parity bit) merely detect the presence of an error, while more complex schemes, such as a cyclic redundancy code (CRC), also have some automatic correction capability. In all cases the correction and detection capability is limited to some predetermined number (and potentially configuration) of errors.

In operation, when the secret key is initially saved into store 125, the corresponding ECC value is calculated and also saved into store 125. Typically therefore, the contents of store 125 comprise a data portion, corresponding to the secret key 125A itself, and an associated ECC portion. When the contents of store 125 are subsequently accessed, the output passes through ECC check unit 426. This check unit compares the data portion and the ECC portion to confirm that they properly match one another. Assuming that this is indeed the case, then the output is forwarded to the encryption unit 130, for the authorisation process previously described. However, in the event of a mismatch, the ECC unit asserts error signal 428.

If the ECC unit 426 does detect an error, this may be due to corruption of one or more bits in the ECC portion or in the key portion 125A (or in both). In the latter case, the corrupted secret key portion will cause the authorisation procedure to fail. In this situation, ECC error signal 428 provides a useful indicator that this authorisation failure is due to a problem with the stored secret key 125A, rather than the supplied authorisation key being incorrect. Note that such indication is provided without compromising in any way the security of secret key 125A. The assertion of error signal 428 will then normally require the relevant chip or module to be replaced, or some other appropriate service operation to be performed (rather than simply trying another authorisation key).

If only the ECC portion of the data in store 125 is corrupted, but not the secret key 125A itself, then in theory the authorisation process can still be performed successfully. (Note that for an uncorrectable error, the ECC unit in general cannot tell whether the corruption is in the data portion of the ECC portion or both). Therefore, in some embodiments, even if the ECC unit 426 does detect an error, it may still pass the (potentially corrupted) secret key 125A to encryption unit 130. This may be done on the basis that the authorisation procedure itself can discriminate as to whether or not the key portion has been corrupted—if not, the authorisation procedure will proceed as normal, thereby allowing use of the device concerned. However, if the key has indeed been corrupted, then authorisation process will fail.

Alternatively, if the ECC unit 426 detects an error, it may simply output a null or inoperative value to encryption unit 130, which then prevents the authorisation process from successfully completing. One rationale for this approach is that a corrupted key store 125 may indicate that there has been some tampering with the device, and so no authorisation should be provided. Note that this result can also be achieved by using ECC error signal 428 to inhibit some part of the authorisation process, for example, by having the ECC signal 428, when asserted, disable the encryption unit 130.

In some circumstances, the ECC utilised may allow the ECC unit 426 not only to detect an error, but also to be able then to correct the error. In this situation, some implementations may not assert error signal 428, but may regard this as within the course of normal operations. Another possibility is that two forms of error signal 428 may be provided, one to signal a corrected error, and another to signal an uncorrectable error.

It will be appreciated that although not shown in FIG. 4, if so desired an ECC could also be used to protect other values stored in chip 100, for example the chip ID 105A, and the contents of EEPROM 405. Similarly, values received over bus 185, such as the system identifier and authorisation key itself may also be protected, if appropriate, by an ECC.

The skilled person will be able to select an appropriate form of ECC for use in the ECC unit 426 (and/or elsewhere) in the embodiment of FIG. 4, dependent on criteria such as the amount of storage available for the ECC bits, the likely nature of any error, and so on. Note that in some cases it may be desirable to use a non-systematic form of ECC (this is where the stored data word does not have separate data and ECC portions, but rather these are integrated into a single data word).

Also shown in FIG. 4 is a delay unit 410. This operates to introduce a time delay between the completion of the internal authorisation process on chip 100, and the outcome of the authorisation process (such as indicated by enable signal 180) being available for reading off the chip. The provision of delay unit 410 hinders any brute force attack on the device, in which a large number of authorisation keys are tried on a trial and error basis until the correct key is found, since it increases the time required between successive trial keys. In other words, if one key is tested, it is not known until after the delay of unit 410 whether this key is correct, and so whether another key should be tested. Accordingly, the time required (on average) for a brute force attack to be successful can be made prohibitively long.

As a further precaution in this regard, chip 100 can be arranged so that only one authorisation key can be entered for each power-on/off cycle. In other words, if there is already a value in authorisation key register 155, then the chip prohibits overwriting this with a new value. Rather, the chip must be powered down first to delete the value in the register, and then powered up again in order to allow the new value to be entered. This arrangement helps to provide a defence against a brute force attack, since there has to be a power off-on cycle inbetween each trial value. Again, this can make the time required for a brute force attack prohibitively long. Note that the system ID register 140 could also be designed to have this property—i.e. to require a power off-on cycle in order to enter a new value.

Another feature shown in FIG. 4 is timeout unit 412, which allows the chip 100 to operate properly for a predetermined time after power on even if the correct authorisation key is not entered. In the particular implementation of FIG. 4, timeout unit provides a positive signal to OR gate 415 for a limited period after power on. This then generates enable signal 180 irrespective of the output of comparator 145 until the end of the timeout period, whereupon the enable signal is maintained or lost according to the output from comparator 145. (The skilled person will be aware of many other possible mechanisms to implement such a timeout in chip 100).

An advantage of having timeout mechanism 412 is that it can help to simplify the boot process. Thus with reference (for example) to the system of FIG. 2, it may take some time when the system is first started for the service processor to supply the correct authorisation keys to all the different modules 222. Having all the modules provisionally authorised during the initial timeout period then ensures that the system can boot up without difficulty, even if there is some delay in obtaining or providing the relevant authorisation keys.

Having a timeout period may also be useful for testing the device. For example, without the timeout period it may be difficult to distinguish a major fault in the chip, such as on bus 185, from a failure to provide the correct authorisation key, or from a failure of the authorisation circuitry itself (since all three may prevent chip 100 from functioning). However, with the timeout period, it is known that any initial failure to operate properly cannot be due to a lack of the correct authorisation key. Thus the timeout period provides an initial period in which to perform any desired fault detection and diagnosis on chip 100, even if the authorisation code is not known.

Note however that the inclusion of timeout unit 412 does provide a potential route for an adversary to subvert the authorisation mechanism of chip 100, for example, if an external agent can reset or corrupt the timeout period to a very long value. In order to safeguard against this, the location and design of timeout unit 412 are such as to render external access and update impossible, or at least very difficult.

The embodiment of FIG. 4 further supports a generalised authorisation facility, which involves providing a special control bit in the authorisation key. If this bit is not set, then the chip authorisation process operates as previously described in relation to FIG. 1. However, if this special bit is set, then control line 431 is asserted. This causes encryption unit 130 to use the chip ID value 105A as the input for the encryption process, rather than the system ID stored in register 140. The authorisation key that corresponds to the encrypted chip ID value 105A then in effect represents a master authorisation key, in that it allows chip 100 to operate in any system (irrespective of the system identifier).

It will be appreciated that the above approach somewhat reduces the security protection of chip 100. Thus if the master authorisation key is known, then chip 100 can be relocated into any other system and activated using this master authorisation key. Accordingly, it is expected that the majority of chips will not in fact support the use of a master key as shown in FIG. 4, but rather require an authorisation key specific to the relevant system identifier (such as shown in FIG. 1). Nevertheless, the support of a master authorisation key may be appropriate for a subset of components, for example for modules specifically manufactured as replacement FRUs, rather than as original system components, or in systems for customers who want to be able to reconfigure their machines without having to obtain further authorisation.

Note however, that some security protection is still maintained in the arrangement of FIG. 4, in that the chip 100 cannot be used unless the master authorisation key is indeed known. Moreover, the master authorisation key cannot be deduced from the chip ID value 105A, assuming that an appropriate encryption algorithm is used, but rather can only be generated from a party having knowledge of the secret key value 125A for chip 100.

The skilled person will be aware of a variety of other potential mechanisms for implementing a master authorisation key, apart from that specifically shown in the embodiment of FIG. 4. For example, rather than using a bit in the supplied authorisation key to drive control signal 431, a separate register may be provided for the master authorisation key (in addition to register 155). The encryption unit 130 and comparator 145 could then in effect perform two authorisations in parallel, one using the normal authorisation key register 155 and the system ID register 140, and the other using the master key and the chip ID store 105. The chip would then be enabled if either of the two authorisations were successful.

Alternatively, there may be only a single register 155 for storing an authorisation key, and the encryption unit and comparator perform both authorisations against the value in this register. In other words, a test is made to see if register 155 contains the master authorisation key (corresponding to chip ID 105A), or the appropriate specific authorisation key (corresponding to the system ID in register 140), with the device being enabled if either of these two tests is positive.

Furthermore, rather than using the chip ID 105A as a code word for encryption and comparison with the master authorisation key, chip 100 could be provided with some other code word for this purpose. For example, this code word may be arranged to have some special value (e.g. zero), or may be programmed into chip 100 and stored in some dedicated memory (e.g. a PROM).

Note that the master authorisation key could be stored in EEPROM 405 as well as or instead of one or more authorisation keys specific to particular system identifiers. As previously discussed EEPROM 405 may be located on chip 100, or on an associated module. In the former case, it could be made write only (i.e. not externally readable), but rather only accessible on-chip to comparator 145.

This has the advantage that the master authorisation key is then not exposed to third parties. Moreover, this may permit the master authorisation key to be deleted from chip 100 (by overwriting the EEPROM) if so desired.

There are of course various strategies that a criminal could adopt to try to circumvent the anti-theft technology so far described. One possibility is based on the fact that a matched pair of system ID and authorisation key will always work for a given chip. Consequently, if a component is stolen from a first system for relocation into a second system, an attempt may be made to still supply it with the system ID of the first system rather than that of the second system. It will be appreciated that this would then allow the component to be operated with the same authorisation key as used in the first system (which may well be available), rather than having to contact the support centre to obtain a new authorisation key to go with the second system ID. This stratagem can be regarded as a form of spoofing the system ID.

Such spoofing can potentially happen on a whole system basis—in other words, the system pretends to have a different system ID from the one that was originally installed. This might be achieved, for example, by manipulating the service processor code to send out a different system ID. However, this would appear to be of very limited benefit to a criminal, since it would only be effective where all the components in a system had been taken from the same initial system (i.e. the one whose ID is being spoofed). In this situation, it would probably be less troublesome for the criminal to try to steal the original system in its entirety, and thereby obviate the need for any such spoofing.

A more serious concern is spoofing on a per chip basis, in which a chip is supplied with a different system ID from other components in the system. Such a technique, which again might be achieved by manipulating the service processor code, would then allow stolen components to be integrated into legitimate systems. Thus the correct system ID would be supplied to the bona fide components in the system, while any stolen components would be supplied with a different system ID, corresponding to the system from which they were stolen (and for which valid authorisation keys are available).

There are various mechanisms that could be employed as a defence against per chip spoofing. For example, in the embodiment of FIG. 2, an identity-colouring scheme could be used, in which the system ID as stored in an authorisation chip 241 alters the communications protocol that the chip uses on bus 210. Consequently, if an authorisation chip contains a different system ID from the other chips, then it cannot talk to them.

As a further precaution, a chip can be arranged so that the system ID can only be written into the device a single time after power-on, as discussed above in relation to FIG. 4. This implies that in order to update or overwrite the contents of the system ID register 140, it is necessary to perform a power-off, power-on cycle (which in turn requires the authorisation key to be re-supplied). This then prevents the service processor from initially providing a chip with a first system identifier to match the supplied authorisation key, and then a different system identifier, in order to overcome any identity-colouring scheme.

Note that such an approach provides protection, even if the service processor code has been compromised, providing the individual authorisation chips 241 in the system 200 still function in a bona fide manner. (Of course, with sufficient time and expertise, an adversary may be able to corrupt all the individual chips to eliminate or corrupt any identity-colouring mechanism. However, this is likely to be an even more complex and time-consuming process than trying to obtain the secret keys themselves for such chips, and so does not seem to be a very likely form of attack).

One way of implementing an identity-colouring scheme is to add the system ID to bus packets. A recipient would then ignore any packets that didn't match the locally stored system ID. A more sophisticated approach would be to exclusive-OR (XOR) the system ID with an error correcting code (ECC) portion included in each bus packet. A recipient would only be able to retrieve the correct ECC if it had a matching system ID; otherwise the incorrect ECC would be obtained. This in turn would cause the incoming packet to be regarded as incorrectly received, and so in effect prevent communications from taking place. Note that this ECC XOR approach does not use any additional bus bandwidth (unlike simply including the system ID in each packet).

A potential drawback with identity-colouring is that it can lead to a lack of compatibility with existing (or future) components that do not support it. One way of avoiding such difficulties is for those components that do include the anti-theft technology (including identity-colouring) to use a different address space on the bus from those components that do not include such technology.

The embodiment shown in FIGS. 1 and 2 is based on a hardware implementation of the anti-theft technology. However, it will be appreciated that other embodiments may use software for part or all of the implementation. For example, the secret key may be stored in a PROM on the chip or PCB. This PROM can then be read by software running on the component containing the PROM. The software receives an authorisation key and system ID from the service processor (or other suitable source, such as a system administrator), and then performs a verification process analogous to that previously described in relation to FIGS. 1 and 2 (it will be appreciated that encryption algorithms such as DES and RSA can be readily implemented in software as well as hardware).

In general, a software implementation is somewhat less secure than one based on hardware. This is because of the increased risk that an adversary can either interact with the software to access or modify the secret key, or can subvert the software to bypass the authorisation procedure in some manner. On the other hand, a software approach does have certain advantages, for example it can potentially be upgraded if a security exposure in an existing implementation is found, or it may be disabled if desired (perhaps in an authorised test environment, where components are rapidly switched between different systems in order to assess how they will perform). It will be appreciated that access to any such upgrade or disablement facility must be made as restricted and difficult as possible, otherwise it will undermine the whole purpose of the anti-theft technology.

Although in the embodiments described above, the authorisation keys are pre-installed into a complete system at manufacture, this is not necessarily the case. Thus to counter the possibility of theft in transit to a customer, a system may be shipped without any stored authorisation keys. These could then be dispatched to the customer by some independent route, such as by post or encrypted email. (This dispatch could either be done in response to a particular customer request, analogous to step 330 in FIG. 3, or automatically in response to customer purchase of a system).

In the anti-theft scheme described herein, it is important that the integrity and confidentiality of the CI→SK database is maintained. It is possible that some customers may require this database (or at least the portions that relate to their own systems) to be submitted to an escrow agency. The agency would then release relevant information from the database to the customer in response to certain predetermined conditions (for example, bankruptcy of the manufacturer). Note that such escrow agreements are already familiar in the context of software source code.

Another concern may arise where a customer has multiple systems, and is unwilling for whatever reason to disclose to a manufacturer exactly how these are configured. In this situation, it can be acceptable for the customer to supply the support centre with a set of system IDs for all its systems, and then to receive a corresponding set of authorisation keys. This will then give the customer full flexibility to move components around within their own systems. A similar approach can also be adopted if a customer maintains spare components in case of failure. The customer can be supplied with the authorisation keys for these components even if they are not yet installed, based on the system ID(s) for the computer(s) belonging to the customer. This would then allow such components to be utilised in the future without having to first contact the support centre. It will be appreciated that neither of these arrangements compromises overall security, in that the components can only be activated in systems known to belong to a given customer.

In conclusion, a variety of particular embodiments have been described in detail herein, but it will be appreciated that this is by way of exemplification only. For example, although the anti-theft technology has been described in the context of computer systems, it can be applied to other items that include electronic components, such as cars, aeroplanes, consumer electronic devices (digital televisions, etc), telecommunications apparatus, and so on. Accordingly, the skilled person will be aware of many further potential modifications and adaptations that fall within the scope of the claimed invention and its equivalents.

The invention claimed is:

1. A semiconductor device, including:
   a stored device identifier that identifies said device, wherein said device identifier is accessible to one or more particular external systems;
   a stored secret key, wherein said secret key is inaccessible to said one or more particular external systems;
   an input configured to receive a system identifier and an authorization key from said one or more particular external systems, wherein said system identifier is an identifier of said one or more particular external systems; and
   an authorization unit configured to enable or disable said device in accordance with the stored secret key, the system identifier and the authorization key, wherein the authorization unit is configured to enable said device in response to determining that the authorization key is based on both the stored secret key and the system identifier.

2. The semiconductor device of claim 1, wherein said authorization unit incorporates an encryption facility.

3. The semiconductor device of claim 2, wherein said encryption facility is operable to encrypt said system identifier using said secret key as an encryption key to create an encrypted system identifier.

4. The semiconductor device of claim 3, wherein said authorization unit further includes a comparator configured to determine that said authorization key matches the encrypted system identifier.

5. The semiconductor device of claim 1, wherein said authorization unit further includes logic for determining a value representing a function of the system identifier and the secret key, and a comparator for verifying said authorization key against said value.

6. The semiconductor device of claim 1, further including a one-time programmable memory for storing said secret key.

7. The semiconductor device of claim 6, wherein said one-time programmable memory comprises a blown-fuse unit.

8. The semiconductor device of claim 1, wherein the authorization unit enables or disables said device in accordance with the values of the stored secret key and device identifier, and of the system identifier and the authorization key.

9. The semiconductor device of claim 1, wherein said secret key is inaccessible to external systems when said device is mounted on a printed circuit board (PCB).

10. The semiconductor device of claim 1, further comprising a pin to allow access to said secret key, wherein said pin is configured so as to be inaccessible or inoperative when the device is mounted on a PCB.

11. The semiconductor device of claim 10, wherein the pin is located underneath the device when the device is mounted on the PCB.

12. The semiconductor device of claim 1, further comprising a pin to allow the authorization unit to be disabled, wherein said pin is configured so as to be inaccessible or inoperative when the device is mounted on a PCB.

13. The semiconductor device of claim 12, wherein the pin is located underneath the device when the device is mounted on the PCB.

14. The semiconductor device of claim 1, wherein the operation of said device is modified according to the system identifier.

15. The semiconductor device of claim 14, wherein a communications protocol used by the device is modified according to the system identifier.

16. The semiconductor device of claim 1, wherein the device provides an external indication of whether the authorization unit is disabling or enabling the device in response to receiving the system identifier and the authorization key.

17. The semiconductor device of claim 16, wherein said external indication is delayed compared to receipt of the system identifier and authorization key.

18. The semiconductor device of claim 1, wherein the stored secret key is protected by an error correction code (ECC).

19. The semiconductor device of claim 18, wherein an external indication is provided if the ECC detects an error in the stored secret key.

20. The semiconductor device of claim 1, wherein said input is operable to receive only a single system identifier after power on, and wherein said device must be powered down before a further system identifier can be received.

21. The semiconductor device of claim 1, wherein said input is operable to receive only a single authorization key after power on, and wherein said device must be powered down before a further authorization key can be received.

22. The semiconductor device of claim 1, wherein said device is operable for a predetermined timeout period after power-on irrespective of the system identifier and the authorization key.

23. The semiconductor device of claim 1, wherein the authorization unit is responsive to input of a master authorization key to enable the device in accordance with the stored secret key, irrespective of the system identifier.

24. The semiconductor device of claim 1, further comprising a PROM containing at least one authorization key for the device.

25. An electronic subsystem for installation into a larger system, said subsystem including:
a stored device identifier that identifies the subsystem, wherein said device identifier is accessible to said larger system;
a stored secret key, wherein said secret key is inaccessible to said larger system;
an input configured to receive a system identifier and an authorization key from said larger system, wherein said system identifier is an identifier of said larger system; and
an authorization unit configured to enable or disable said subsystem in accordance with the stored secret key, the system identifier and the authorization key; wherein the authorization unit is configured to enable said device in response to determining that the authorization key is based on both the stored secret key and the system identifier.

26. An electronic system, comprising:
a stored system identifier that identifies the electronic system; and
at least one component comprising a stored device identifier that identifies the at least one component and is accessible to one or more other components of said electronic system, the at least one component further comprising a stored secret key inaccessible to said one or more other components of said electronic system;
wherein the at least one component comprises a communications path configured to receive the system identifier and an authorization key from the electronic system;
wherein said at least one component is configured to be activated in response to determining that the authorization key is dependent on both the received system identifier and said stored secret key.

27. The electronic system of claim 26, further comprising mappings of authorization keys to corresponding device identifiers, wherein the electronic system is configured to supply said authorization key to the at least one component in response to determining that said stored device identifier matches a particular mapping of said mappings, wherein that mapping corresponds to said authorization key supplied to the at least one component.

28. The electronic system of claim 27, further comprising an on-line communications link for acquiring from a support center an authorization key for a device identifier whose authorization key is not in said mappings.

29. The electronic system of claim 26, wherein the operation of said at least one component is modified according to the system identifier.

30. The electronic system of claim 29, wherein a communications protocol used by the at least one component is modified according to the system identifier.

31. A method of manufacturing a semiconductor device, comprising:
storing a device identifier and a secret key on the device, wherein said device identifier identifies said device, wherein said device identifier is accessible to one or more particular external systems, and wherein said secret key is inaccessible to said one or more particular external systems; and
incorporating into the device an authorization unit for enabling or disabling the device in accordance with the stored secret key and a system identifier and an authorization key both received from said one or more particular external systems, wherein said system identifier is an identifier of said one or more particular external systems, wherein the authorization unit is configured to enable said device in response to determining that the authorization key is based on both the stored secret key and the system identifier.

32. The method of claim 31, wherein said authorization unit incorporates an encryption facility.

33. The method of claim 32, wherein said encryption facility is operable to encrypt said system identifier using said secret key as an encryption key.

34. The method of claim 31, further comprising using a one-time programmable memory for storing said secret key.

35. The method of claim 31, further comprising storing at least one authorization key appropriate to a predetermined system identifier in the device.

36. The method of claim 31, further comprising mounting said device on a PCB, and wherein said secret key is inaccessible to external systems after it has been mounted said PCB.

37. The method of claim 36, further comprising reading the secret key from the semiconductor device prior to said step of mounting on the PCB.

38. The method of claim 31, further comprising the step of making a record of the device identifier and the secret key stored on the device.

39. A method of manufacturing an electronic system, comprising:
  storing a system identifier in the system;
  installing at least one component including a stored device identifier and a stored secret key into the system, wherein said at least one component is configured to be enabled or disabled for use in accordance with the system identifier, a received authorization key, and the stored secret key, wherein the at least one component is configured to be enabled in response to determining that the authorization key is based on both the stored secret key and the system identifier; and
  creating in the electronic system for each at least one component installed into the system, a record of a matched pair including an authorization key to be used with that component in conjunction with the stored system identifier, wherein the authorization key is mapped in the record to the device identifier for the corresponding component.

40. A method of operating an electronic system comprising:
  accessing a system identifier for the electronic system;
  ascertaining a device identifier associated with a component of the electronic system, said component including a secret key;
  providing an authorization key and the system identifier to said component, wherein a correct authorization key is dependent upon said system identifier and said secret key;
  determining within the component whether or not the provided authorization key is the correct authorization key, based on the system identifier and the secret key for the component;
  disabling or enabling said component according to whether or not the authorization key is the correct authorization key.

41. The method of claim 40, wherein said steps of accessing, ascertaining, and providing are performed at system power-on by a system controller.

42. The method of claim 41, wherein said ascertaining comprises the system controller:
  sending a request to each component installed in the system;
  and receiving a response back including the device identifier for that component.

43. The method of claim 42, further comprising storing a list of authorization keys within the system, and the system controller accessing said list to retrieve an authorization key for a component based on the received device identifier for that component.

44. The method of claim 40, further comprising storing at least one authorization key appropriate to a particular system identifier in association with said component, wherein a stored authorization key is provided for determining within the component whether or not to disable the component.

45. The method of claim 44, wherein multiple pairs of system identifiers and corresponding authorization keys are stored, and further comprising using the accessed system identifier in order to determine a corresponding stored authorization key from said multiple pairs of system identifiers and corresponding authorization keys.

46. The method of claim 40, wherein said determining includes performing an encryption function on the system identifier using the secret key.

47. The method of claim 40, further comprising:
  in response to an authorization key not being available for a component having a particular device identifier, making a request for an authorization key for that component, wherein said request includes the device identifier for the component; and
  receiving an authorization key for the component in response to the request.

48. The method of claim 47, wherein said request is made on-line to a remote support center.

49. The method of claim 48, wherein said response is received on-line from the support center.

50. The method of claim 40, wherein the operation of a component in the electronic system is modified according to the system identifier provided to the component.

51. The method of claim 50, wherein a communications protocol used by a component is modified according to the system identifier provided to the component.

52. A method of operating a support center comprising the steps of:
  maintaining a database of components, wherein for each component there is a stored device identifier and secret key;
  receiving a request to allow a component having a particular device identifier to be used in a system having a particular system identifier;
  retrieving the secret key for the component based on the particular device identifier within said request;
  determining an authorization key for the component, based on the received system identifier and retrieved secret key; and
  providing a response to said request, wherein the response includes the determined authorization key.

53. The method of claim 52, wherein said determining step includes performing an encryption function on the received system identifier using the retrieved secret key.

54. The method of claim 52, wherein said request is received and said response provided via a web site.

55. The method of claim 52, wherein said request is received and said response provided via telephone.

56. The method of claim 52, wherein said request is received and said response provided via an on-line connection between said system and said support center.

57. The method of claim 52, further comprising the step of checking that the system identifier in the request does not correspond to a system that has been reported stolen.

58. The method of claim 52, further comprising the step of checking that the device identifier in the request does not correspond to a device that has been reported stolen.

59. The method of claim 52, further comprising the step of checking that the device identifier in the request does not correspond to a device that is incompatible with the system specified by the system identifier.

60. A semiconductor device, including:
  means for storing a device identifier that identifies said device, wherein said device identifier is accessible to one or more particular external systems;
  means for storing a secret key, wherein said secret key is inaccessible to said one or more particular external systems;

means for receiving a system identifier and an authorization key from said one or more particular external systems, wherein said system identifier is an identifier of said one or more particular external systems; and means for enabling or disabling said device in accordance with the stored secret key, the system identifier and the authorization key, wherein said means for enabling or disabling includes means for enabling said device in response to determining that the authorization key is based on both the stored secret key and the system identifier.

61. An electronic system, comprising:

means for storing a system identifier identifying said system;

at least one component including means for storing a device identifier such that the device identifier is accessible to one or more other components of said electronic systems and a stored secret key such that the stored secret key is inaccessible to said one or more other components of said electronic system, wherein the device identifier identifies said at least one component;

means for supplying said at least one component with the stored system identifier and with an authorization key that is dependent on said system identifier and said stored secret key; and means for enabling said at least one component in response to determining that the authorization key is dependent on said system identifier and said stored secret key.

62. A program product, comprising machine instructions on a medium for loading into an electronic system, wherein said instructions cause the system to perform the steps of:

accessing a system identifier for the electronic system;

ascertaining a device identifier associated with a particular component of the electronic system, said particular component including a stored secret key that is inaccessible to all other components of the electronic system; and providing an authorization key and the system identifier to said particular component;

generating, via the particular component, a correct authorization key that is dependent upon said system identifier and said secret key; and determining, via the particular component, whether or not the authorization key matches said correct authorization key and enabling or disabling the particular component in accordance with that determination.

63. A program product, comprising machine instructions on a medium for loading into a computer, wherein said instructions cause the computer to perform the steps of:

receiving a request to allow a component having a particular device identifier to be used in a system having a particular system identifier;

accessing a database of components, wherein for each component there is a stored device identifier and secret key;

retrieving from the database a secret key for the component based on the particular device identifier;

determining an authorization key for the component, based on the received system identifier and retrieved secret key; and providing a response to said request, wherein the response includes the determined authorization key.

* * * * *